United States Patent
Fujitsu et al.

(10) Patent No.: US 10,712,428 B2
(45) Date of Patent: Jul. 14, 2020

(54) RADAR DEVICE AND TARGET DETECTING METHOD

(71) Applicant: DENSO TEN Limited, Kobe-shi, Hyogo (JP)

(72) Inventors: Seiya Fujitsu, Kobe (JP); Hisateru Asanuma, Kobe (JP)

(73) Assignee: DENSO TEN LIMITED, Kobe (JP)

( * ) Notice: Subject to any disclaimer, the term of this patent is extended or adjusted under 35 U.S.C. 154(b) by 235 days.

(21) Appl. No.: 15/900,102

(22) Filed: Feb. 20, 2018

(65) Prior Publication Data

US 2018/0313935 A1    Nov. 1, 2018

(30) Foreign Application Priority Data

Apr. 27, 2017 (JP) ................. 2017-087973

(51) Int. Cl.
| | | |
|---|---|---|
| *G01S 7/35* | (2006.01) | |
| *G01S 13/931* | (2020.01) | |
| *G01S 13/42* | (2006.01) | |
| *G01S 7/41* | (2006.01) | |
| *G01S 13/87* | (2006.01) | |
| *G01S 13/34* | (2006.01) | |

(52) U.S. Cl.
CPC ............. *G01S 7/354* (2013.01); *G01S 7/411* (2013.01); *G01S 13/345* (2013.01); *G01S 13/42* (2013.01); *G01S 13/878* (2013.01); *G01S 13/931* (2013.01); *G01S 2013/93272* (2020.01)

(58) Field of Classification Search
CPC combination set(s) only.
See application file for complete search history.

(56) References Cited

U.S. PATENT DOCUMENTS

2013/0088380 A1*  4/2013  Isoda .................. G01S 7/285
                                                          342/109
2014/0313070 A1* 10/2014  Asanuma ............ G01S 13/345
                                                          342/200

(Continued)

FOREIGN PATENT DOCUMENTS

JP     2008-126401 A     6/2008
JP     2015-210157 A    11/2015

(Continued)

*Primary Examiner* — Mamadou L Diallo
(74) *Attorney, Agent, or Firm* — Oliff PLC

(57) ABSTRACT

There is provided a radar device for detecting a target based on a frequency-modulated transmission wave and reflected waves of the transmission wave from the target. An extracting unit configured to extract peaks corresponding to the target based on beat signals which are differential waves between the transmission wave and the reflected waves. A generating unit configured to generate instantaneous values corresponding to the peaks based on the peaks extracted by the extracting unit. A filtering unit configured to generate a target data item corresponding to the instantaneous values by performing chronological filtering on the instantaneous values generated by the generating unit. The filtering unit can assign a plurality of instantaneous values to an assignment range corresponding to one target data item, based on individual elements included in the instantaneous values.

7 Claims, 16 Drawing Sheets

(56) References Cited

U.S. PATENT DOCUMENTS

| | | | | |
|---|---|---|---|---|
| 2015/0309167 A1* | 10/2015 | Shikatani | ............... | G01S 13/56 |
| | | | | 342/27 |
| 2015/0309171 A1* | 10/2015 | Ishimori | ............... | G01S 13/345 |
| | | | | 342/27 |
| 2016/0154103 A1* | 6/2016 | Moriuchi | ............. | G01S 13/931 |
| | | | | 342/70 |
| 2017/0356991 A1* | 12/2017 | Yosoku | ................ | G01S 13/589 |
| 2017/0363718 A1* | 12/2017 | Ishimori | .................. | G01S 7/40 |
| 2017/0363720 A1* | 12/2017 | Moriuchi | ................. | G01S 7/41 |
| 2017/0363735 A1* | 12/2017 | Aoki | ........................ | G01S 7/35 |
| 2017/0363737 A1* | 12/2017 | Kaino | .................... | G01S 13/88 |
| 2017/0363738 A1* | 12/2017 | Kaino | .................... | G01S 13/32 |

FOREIGN PATENT DOCUMENTS

| | | |
|---|---|---|
| JP | 2016-128751 A | 7/2016 |
| JP | 2016-166802 A | 9/2016 |

\* cited by examiner

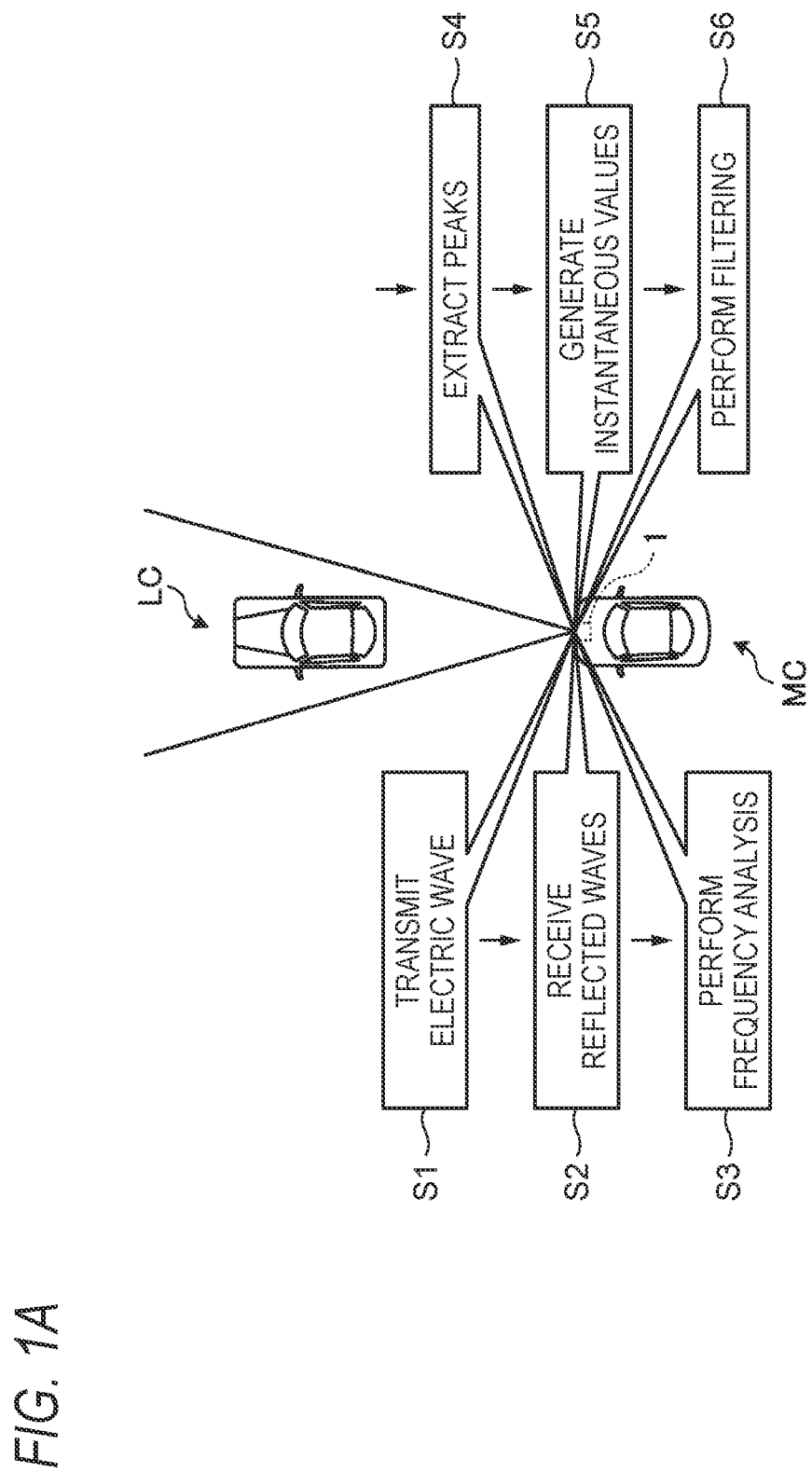

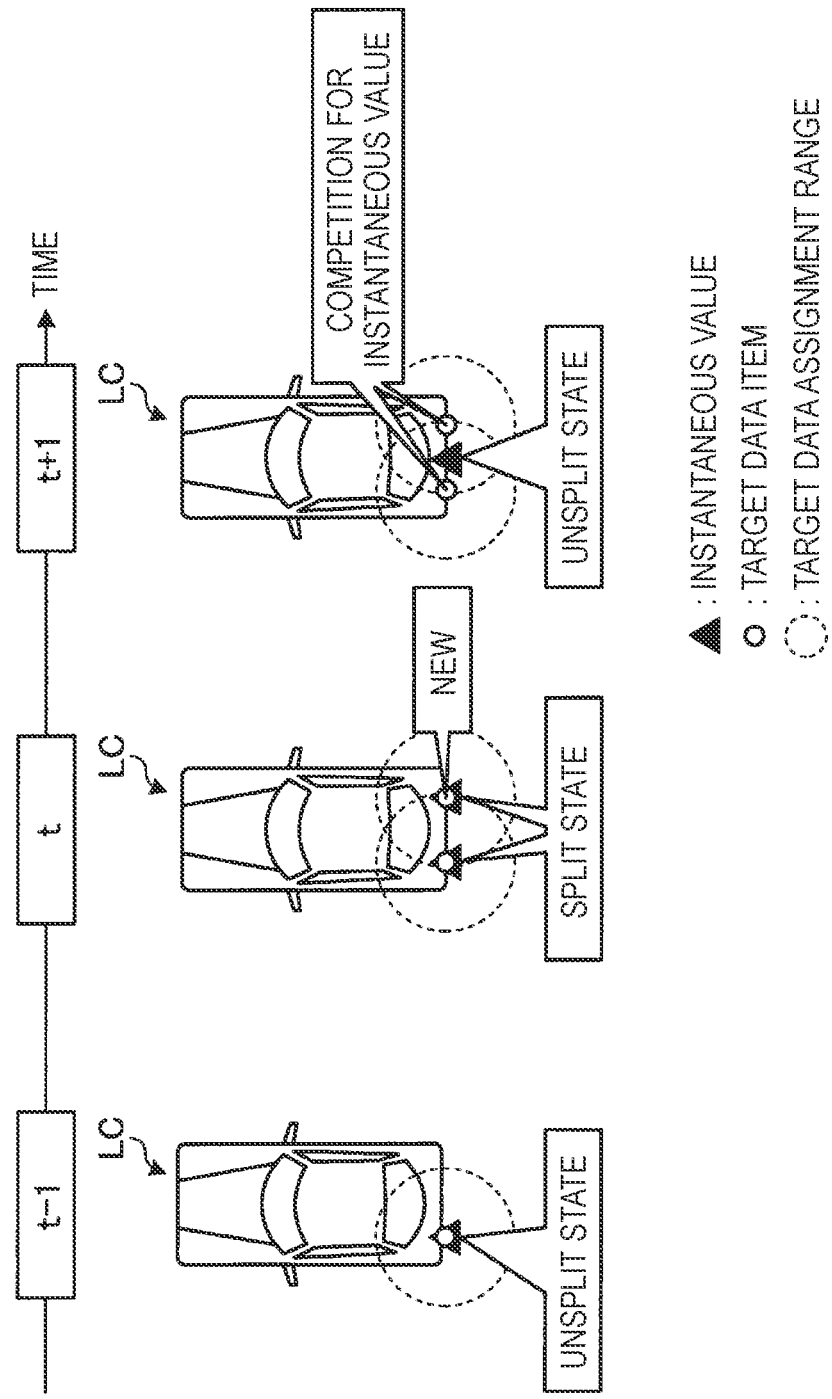

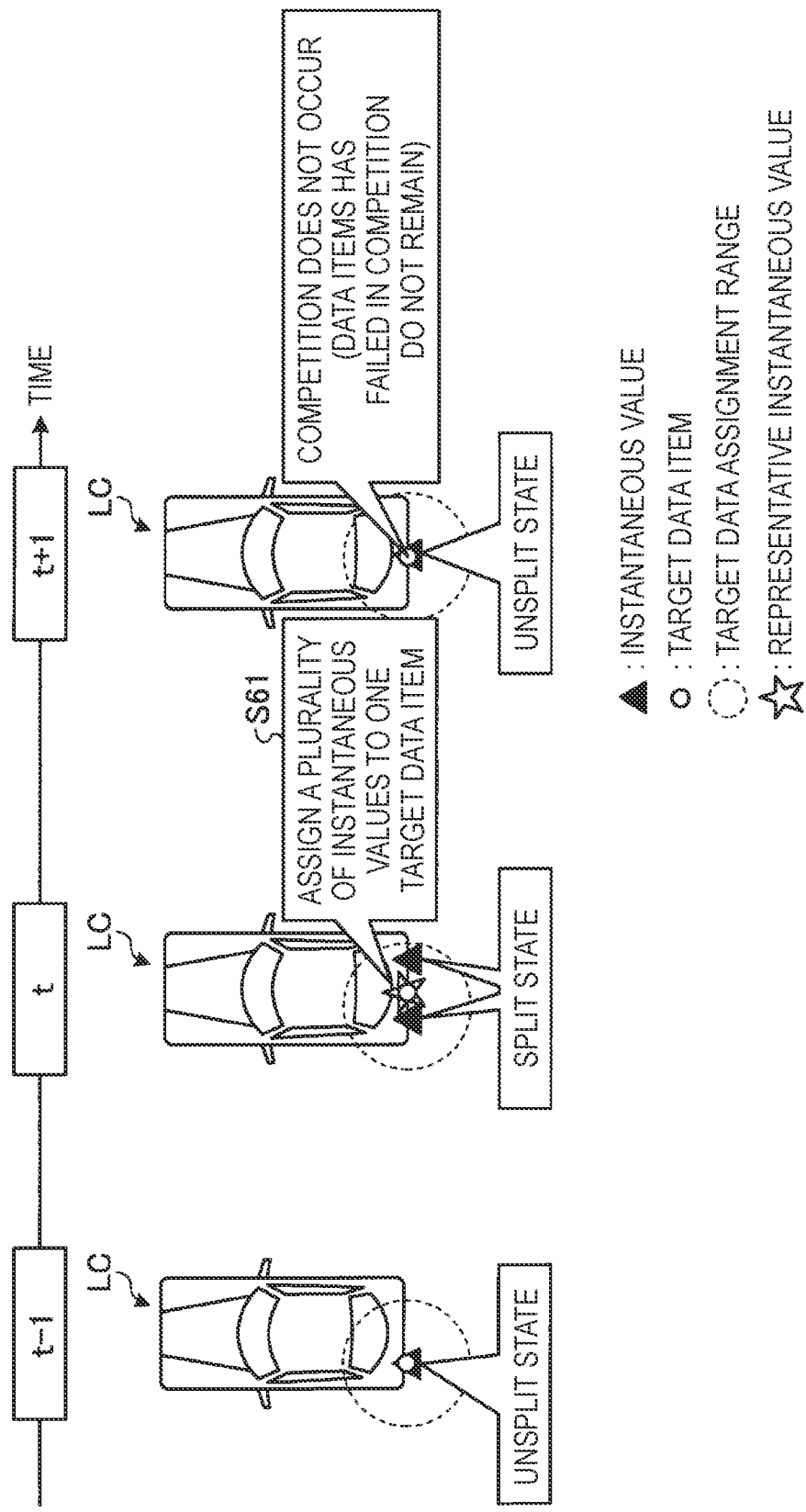

RADAR DEVICE AND TARGET DETECTING METHOD

CROSS-REFERENCE TO RELATED APPLICATIONS

This application is based on and claims priority under 35 USC 119 from Japanese Application No. 2017-87973 filed on Apr. 27, 2017.

BACKGROUND

Technical Field

The present disclosure relates to a radar device and a target detecting method.

Related Art

In the related art, a radar device which can be mounted on a vehicle or the like, and periodically detect targets by transmitting transmission waves from the corresponding vehicle, and receiving the reflected waves from targets, and performing a signal processing procedure on the basis of the reception signals is known (see Patent Document 1 for instance).

In such a radar device, various processes such as electric-wave transmission, reflected-wave reception, frequency analysis, peak extraction, instantaneous-value generation, and a filtering process are performed sequentially.

In the procedure from the electric-wave transmission to the instantaneous-value generation, frequency analysis is performed on beat signals representing the frequency differences between a transmission signal and reception signals, and from power peaks corresponding to individual frequencies obtained as the analysis result, the instantaneous values of the distances, relative velocities, and angles of targets corresponding to the peaks are generated.

In the filtering process, chronological filtering is performed on instantaneous values obtained in the latest cycle, and with respect to each target, a target data item is generated.

[Patent Document 1] Japanese Patent Application Laid-Open No. 2015-210157

However, the above-described technology according to the related art has room for improvement in order to improve the accuracy of detection on targets.

Specifically, in the signal processing procedure, first, on the assumption that peaks extracted by the peak extracting process correspond to individual targets, respectively, the instantaneous-value generation and the subsequent processes are performed on each peak.

However, from one target (for example, a vehicle), if the reflection level is lower than a predetermined value, a peak may not be extracted, or a plurality of reflection points may occur and a plurality of peaks may be extracted. For this reason, the number of instantaneous values corresponding to one target is not limited to one, and may be 0, or 2 or more.

Therefore, in the case where a target data item is generated for each instantaneous value, if only one target is detected by processing in a certain cycle, but two instantaneous values are obtained by processing in the next cycle, two target data items are generated for one target. Further, with respect to the corresponding target, if the number of instantaneous values is reduced to one in the subsequent cycle, the two target data items compete for one instantaneous value. Therefore, the stability of target detection may decrease.

Also, such competition may cause change of the target data items, resulting in decrease in the reliability of target detection. In other words, such competition may reduce the accuracy of target detection.

SUMMARY

It is therefore an object of the present disclosure to provide a radar device and a target detecting method capable of improving the accuracy of target detection.

A radar device according to the present disclosure is a radar device for detecting a target based on a frequency-modulated transmission wave and reflected waves of the transmission wave from the target. The extracting unit extracts peaks corresponding to the target based on beat signals which are differential waves between the transmission wave and the reflected waves. The generating unit generates instantaneous values corresponding to the peaks based on the peaks extracted by the extracting unit. The filtering unit generates a target data item corresponding to the instantaneous values by performing chronological filtering on the instantaneous values generated by the generating unit. Also, the filtering unit can assign a plurality of instantaneous values to an assignment range corresponding to one target data item, based on individual elements included in the instantaneous values.

According to the present disclosure, it is possible to improve the accuracy of target detection.

BRIEF DESCRIPTION OF THE DRAWINGS

Exemplary embodiments of the present invention will be described in detail based on the following figures, wherein:

FIG. 1A is a view for explaining a first part of an outline of a target detecting method according to an embodiment;

FIG. 1B is a view for explaining an outline of a target detecting method according to a comparative example;

FIG. 1C is a view for explaining a second part of the outline of the target detecting method according to the embodiment;

DETAILED DESCRIPTION

Figure 2:
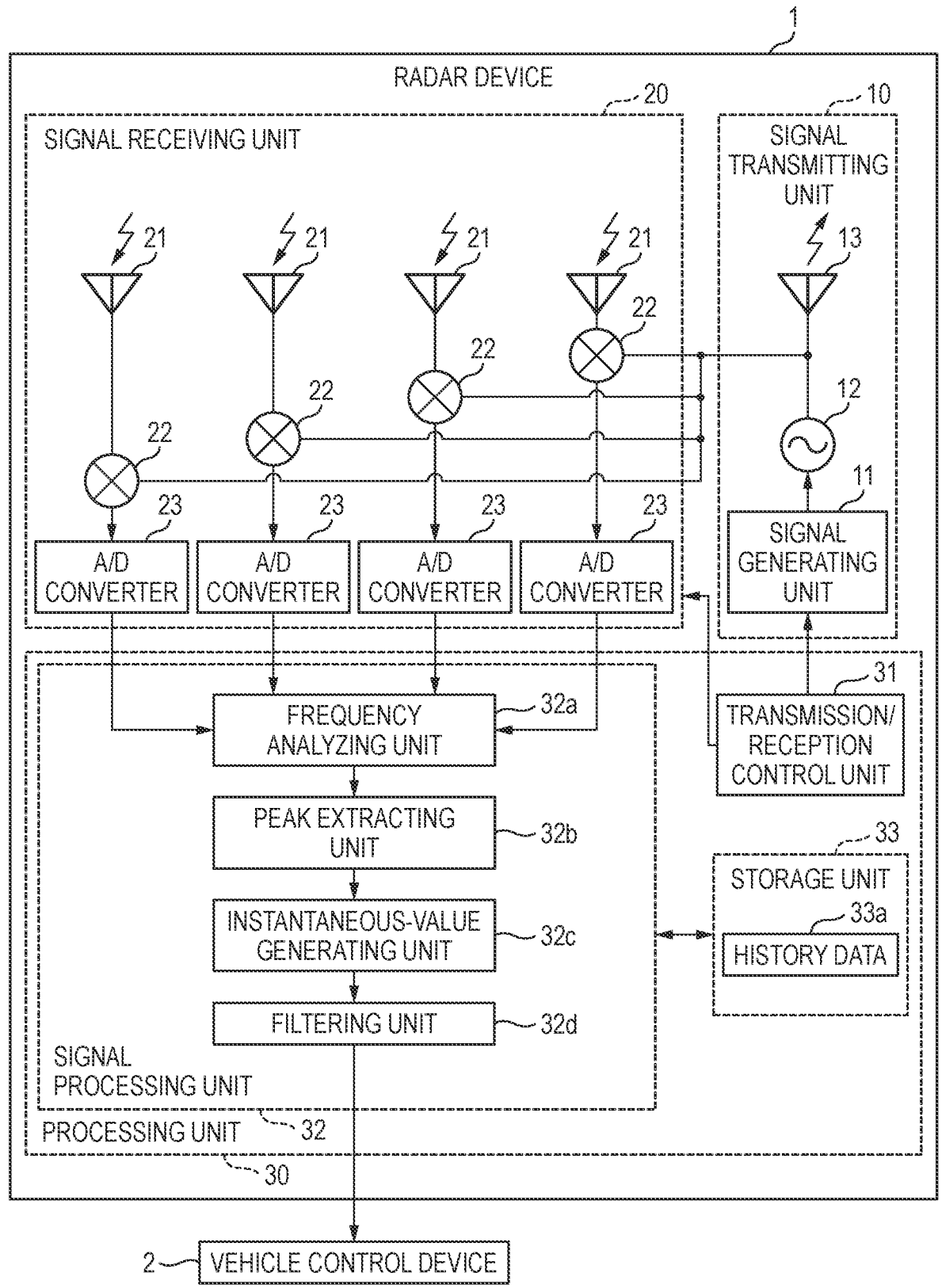
FIG. 2 is a block diagram illustrating a radar device according to a first embodiment.

Hereinafter, an embodiment of a radar device and a target detecting method according to the present invention will be described in detail with reference to the accompanying drawings. However, the present invention is not limited by the following embodiment.

Also, hereinafter, an outline of a target detecting method according to the present embodiment will be first described with reference to FIG. 1A to FIG. 1C, and then a radar device 1 using the target detecting method according to the present embodiment will be described with reference to FIG. 2 to FIG. 9C.

Further, a first embodiment will be described with reference to FIG. 1A to FIG. 8B, and a second embodiment will be described with reference to FIG. 9A and FIG. 9B, and a third embodiment will be described with reference to FIG. 9C. Furthermore, hereinafter, the case where the radar device 1 is a FM-CW type will be taken as an example.

First Embodiment

First, an outline of a target detecting method according to the present embodiment will be described with reference to FIG. 1A to FIG. 1C. FIG. 1A and FIG. 1C are views for explaining a first part and a second part of the outline of the target detecting method according to the present embodiment. Also, FIG. 1B is a view for explaining an outline of a target detecting method according to a comparative example.

As shown in FIG. 1A, a radar device 1 is mounted, for example, inside the front grille or the like of a vehicle MC, and detects targets (for example, preceding vehicles LC and the like) existing in the traveling direction of the vehicle MC. However, the mounting place of the radar device 1 is not limited thereto, and the radar device may be installed at any other place such as front glass, a rear grill, or a left or right side part (for example, a left door mirror or a right door mirror).

Also, the flow of basic processing of the radar device 1 is as follows. In other words, as shown in FIG. 1A, the radar device 1 transmits a transmission wave (STEP 51), and receives reflected waves of the transmission wave from targets (STEP S2).

Then, the radar device 1 performs frequency analysis on beat signals representing the frequency differences between the transmission signal and the reception signals (STEP S3), and extracts peaks estimated to correspond to targets, from the analysis results (STEP S4).

Subsequently, the radar device 1 generates instantaneous values of the distances, relative velocities, and angles of the extracted peaks to the vehicle MC (STEP S5), and performs filtering on the basis of the generated instantaneous values (STEP S6), thereby generating target data items.

Here, the target data items are data items (filtered values) obtained by performing chronological filtering on the instantaneous values, and one target data item is estimated to correspond to one target. The radar device 1 periodically repeats the procedure of STEPS 51 to S6, and updates target data in each cycle. Therefore, it is possible to track targets.

However, from one target, a plurality of reflection points may occur, and a plurality of peaks may be extracted, and a plurality of instantaneous values may be obtained on the basis of the extracted peaks. This is referred to as splitting, and as shown in FIG. 1B, in the case where an instantaneous value is in an unsplit state at a time (t−1), but splitting has occurred at a time t, for example, a target detecting method according to a comparative example assigns a new target data item to a new instantaneous value generated by splitting.

In other words, in this case, with respect to one target, a plurality of target data items exists. In such case, if another unsplit state has occurred at a time (t+1), competition for one instantaneous value between the plurality of target data items occur, so the stability of target detection may decrease. Also, as a result, change of target data may occur, resulting in decrease in the reliability of target detection. In other words, there is room for improvement in order to improve the accuracy of detection on targets.

For this reason, as shown in FIG. 1C, even in the case where an unsplit state at a time (t−1) changes to a split state at a time t, so a plurality of instantaneous values is obtained from one target, the target detecting method according to the present embodiment can assign the plurality of instantaneous values to one target data item by filtering (STEP S61). Also, assigning may be referred to as associating.

In other words, the target detecting method according to the present embodiment processes instantaneous values such that the plurality of instantaneous values is included in one target data assignment range and one target data item is generated as shown in FIG. 1C. For example, in the target detecting method according to the present embodiment, a representative instantaneous value is generated as a representative value of the plurality of instantaneous values, and a target data item is generated on the basis of the generated representative instantaneous value.

Also, to this end, in the target detecting method according to the present embodiment, filtering using a so-called particle filter, i.e. a sequential monte carlo method is performed. This filtering will be described below in detail with reference to FIG. 5 and the subsequent drawings.

Therefore, for example, even if an unsplit state has occurred at a time t, competition for one instantaneous value between a plurality of target data items does not occur (in other words, target data items which has failed in the competition for the instantaneous value do not remain). In other words, according to the target detecting method of the present embodiment, it is possible to prevent decrease in the stability and reliability of target detection, and it becomes possible to improve the accuracy of target detection.

Hereinafter, a radar device 1 using the above-described target detecting method will be described in more detail.

FIG. 2 is a block diagram illustrating the radar device 1 according to the first embodiment. In FIG. 2, only components necessary for explaining features of the present embodiment are shown by functional blocks, and general components are not shown.

In other words, the components shown in FIG. 2 are functionally conceptual, and do not need to have a physically configuration as shown in FIG. 2. For example, distribution or integration of the individual functional blocks is not limited to a specific mode shown in FIG. 2, and it is possible to distribute or integrate all or a part thereof functionally or physically in an arbitrary unit, depending on various loads, usage conditions, and so on. Also, the same is true with respect to FIG. 5 and FIG. 9B which are block diagrams illustrating filtering units 32d and 32d'.

As shown in FIG. 2, the radar device 1 includes a signal transmitting unit 10, a signal receiving unit 20, and a processing unit 30. The radar device 1 is connected to a vehicle control device 2 configured to control behavior of a vehicle MC.

The vehicle control device 2 performs vehicle control on a pre-crash safety system (PCS), an AEB (Advanced Emergency Braking) system, and the like, on the basis of the results of target detection of the radar device 1.

The signal transmitting unit 10 includes a signal generating unit 11, an oscillator 12, and a transmitting antenna 13. The signal generating unit 11 generates a modulation signal for transmitting a frequency-modulated millimeter wave having a triangular waveform, under control of a transmission/reception control unit 31 to be described below. The oscillator 12 generates a transmission signal on the basis of the modulation signal generated by the signal generating unit 11, and outputs the transmission signal to the transmitting antenna 13. Also, as shown in FIG. 2, the transmission signal generated by the oscillator 12 is distributed even to mixers 21 to be described below.

The transmission antenna 13 converts the transmission signal received from the oscillator 12, into a transmission wave, and outputs the transmission wave to the outside of the vehicle MC. The transmission wave which is output from the transmitting antenna 13 is a frequency-modulated continuous wave having a triangular waveform. The transmission wave transmitted from the transmitting antenna 13 to the outside of the vehicle MC, for example, forward from the vehicle is reflected from targets such as preceding vehicle LC, thereby becoming reflected waves.

The signal receiving unit 20 includes a plurality of receiving antennae 21 forming an array antenna, the plurality of mixers 22, and a plurality of A/D converters 23. A mixer 22 and an A/D converter 23 are provided for each receiving antenna 21.

The individual receiving antennae 21 receive reflected waves from targets, as reception waves, and convert the reception waves into reception signals, and outputs the reception signals to the mixers 22. Also, the number of receiving antennae 21 shown in FIG. 2 is four; however, it may be three or less, or five or more.

The reception signals output from the receiving antennae 21 are amplified by amplifiers (not shown in the drawings) (for example, low-noise amplifiers), and then are input to the mixers 22. The mixers 22 partially mix the distributed transmission signal and the reception signals received from the receiving antennae 21, thereby generating beat signals without unnecessary signal components, and output the beat signals to the A/D converters 23.

The beat signals are the differential waves between the transmission wave and the reception waves, and have beat frequencies which are the differences between the frequency of the transmission signal (hereinafter, referred to as the transmission frequency) and the frequencies of the reception signals (hereinafter, referred to as the reception frequencies). The beat signals generated in the mixers 22 are converted into digital signals in the A/D converters 23, and are output to the processing unit 30.

The processing unit 30 includes the transmission/reception control unit 31, a signal processing unit 32, and a storage unit 33. The signal processing unit 32 includes a frequency analyzing unit 32a, a peak extracting unit 32b, an instantaneous-value generating unit 32c, and a filtering unit 32d.

The storage unit 33 is for storing history data 33a. The history data 33a is information including the history of target data used in the signal processing procedure performed in the signal processing unit 32.

The processing unit 30 is, for example, a microcomputer including a CPU (Central Processing Unit), a ROM (Read Only Memory), a RAM (Random Access Memory), and registers corresponding to the storage unit 33, input/output ports, and so on, and controls the whole of the radar device 1.

The CPU of the microcomputer functions as the transmission/reception control unit 31 and the signal processing unit 32 by reading out programs from the ROM and executing the programs. All of the transmission/reception control unit 31 and the signal processing unit 32 may be configured with hardware such as an ASIC (Application Specific Integrated Circuit), an FPGA (Field Programmable Gate Array), and the like.

The transmission/reception control unit 31 controls the signal transmitting unit 10 including the signal generating unit 11, and the signal receiving unit 20. The signal processing unit 32 periodically performs the signal processing procedure. Now, components of the signal processing unit 32 will be described.

The frequency analyzing unit 32a performs a fast Fourier transform (FFT) process (hereinafter, referred to as an FFT process) on each of the beat signals received from the A/D converters 23, and outputs the result to the peak extracting unit 32b. The result of the FFT process on a beat signal is the frequency spectrum of the beat signal, and represents the power value (signal level) of the beat signal at each frequency (at each of frequency bins set at intervals of a frequency according to frequency resolution).

The peak extracting unit 32b extracts peak frequencies of peaks from the results of the FFT processes of the frequency analyzing unit 32a, and outputs the extraction results to the instantaneous-value generating unit 32c. The peak extracting unit 32b extracts the peak frequencies in the UP sections and DN sections of the beat signals (to be described below).

The instantaneous-value generating unit 32c performs an angle estimating process of calculating the incident angles and power values of the reflected waves corresponding to the peak frequencies extracted in the peak extracting unit 32b. At the moment where the angle estimating process is performed, the incident angles are angles assumed to be angles at which targets exist, and hereinafter will also be referred to as estimate angles.

Also, the instantaneous-value generating unit 32c performs a pairing process of determining correct pairs of peak frequencies of the UP sections and the DN sections on the basis of the calculation results such as the calculated estimate angles and the calculated power values.

Also, the instantaneous-value generating unit 32c calculates the distances and relative velocities of the individual targets to the vehicle MC, from the determined pair results. Further, the instantaneous-value generating unit 32c outputs the calculated estimate angles, distances and relative velocities of the individual targets, as instantaneous values corresponding to the latest cycle (the latest scanning), to the filtering unit 32d.

Figure 3:
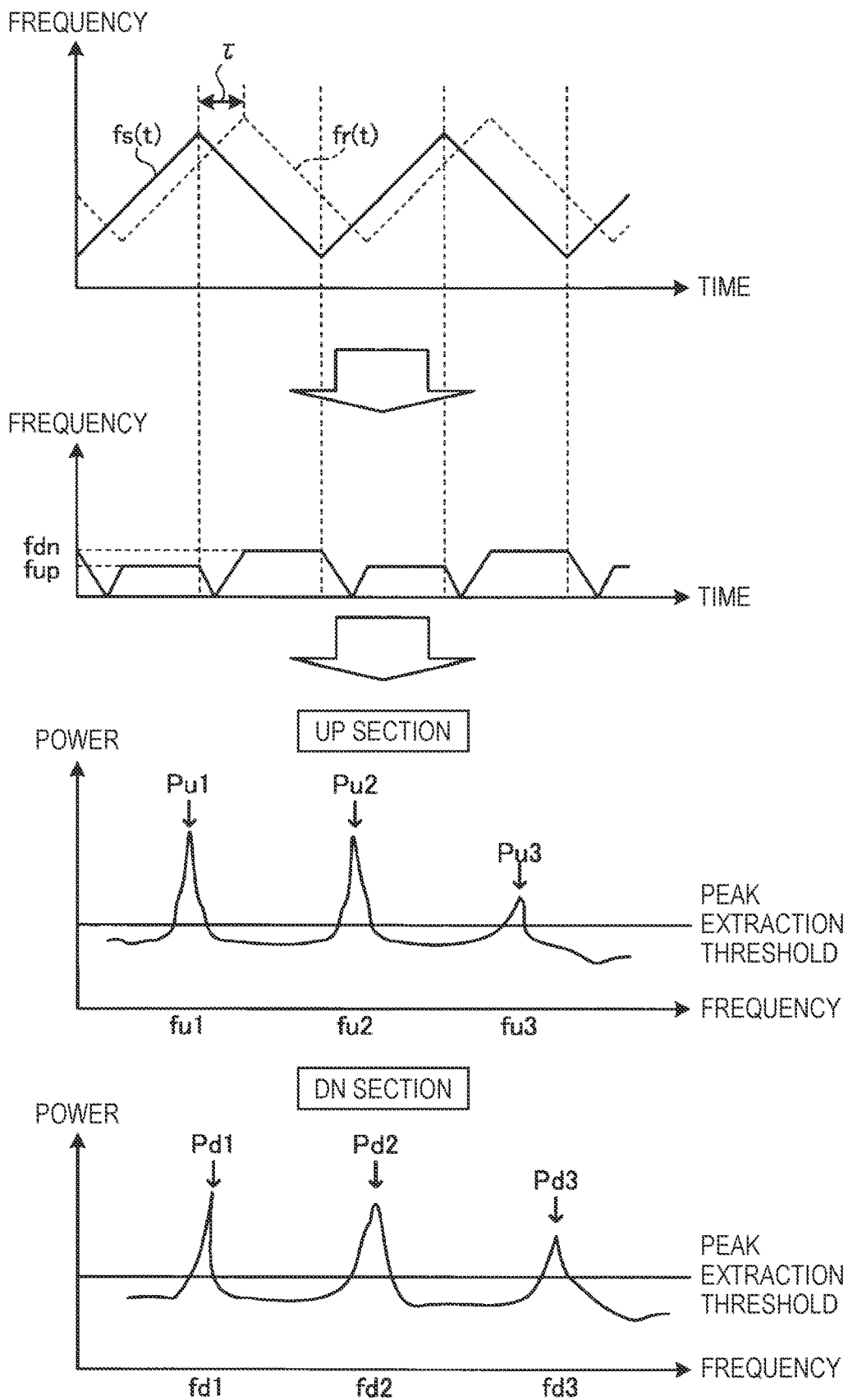
FIG. 3 is a view for explaining a procedure from a preliminary process of a signal processing unit to a peak extracting process of the signal processing unit.
Figure 4A:
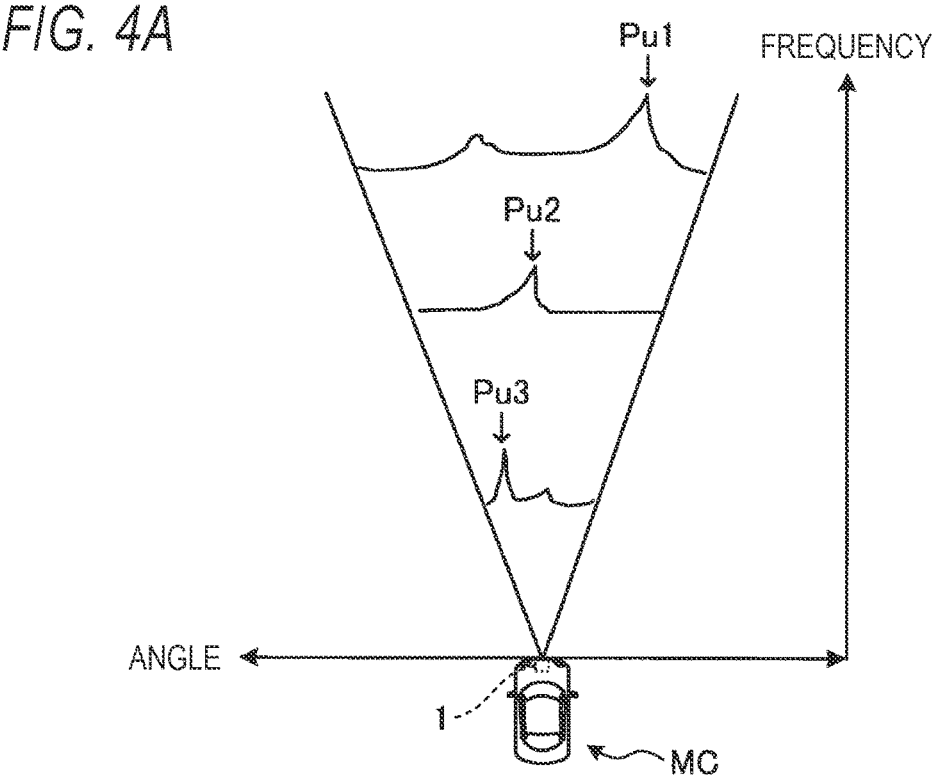
FIG. 4A is a view for explaining the procedure of an angle estimating process.
Figure 4B:
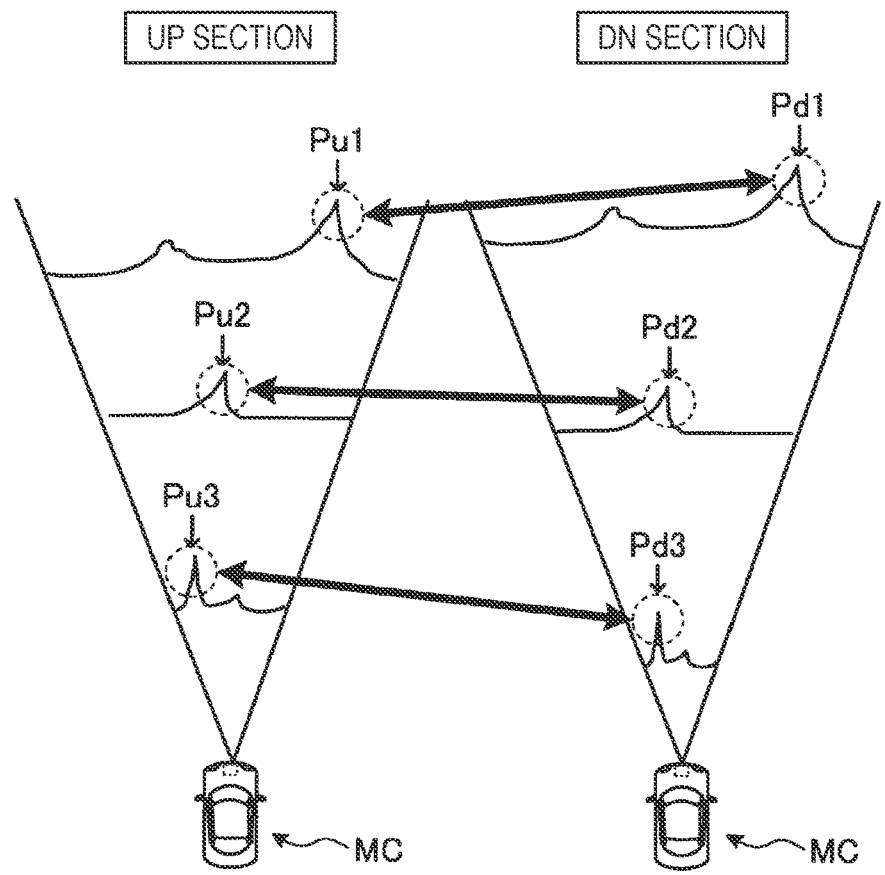
FIG. 4B is a view for explaining a first part of the procedure of a pairing process.
Figure 4C:
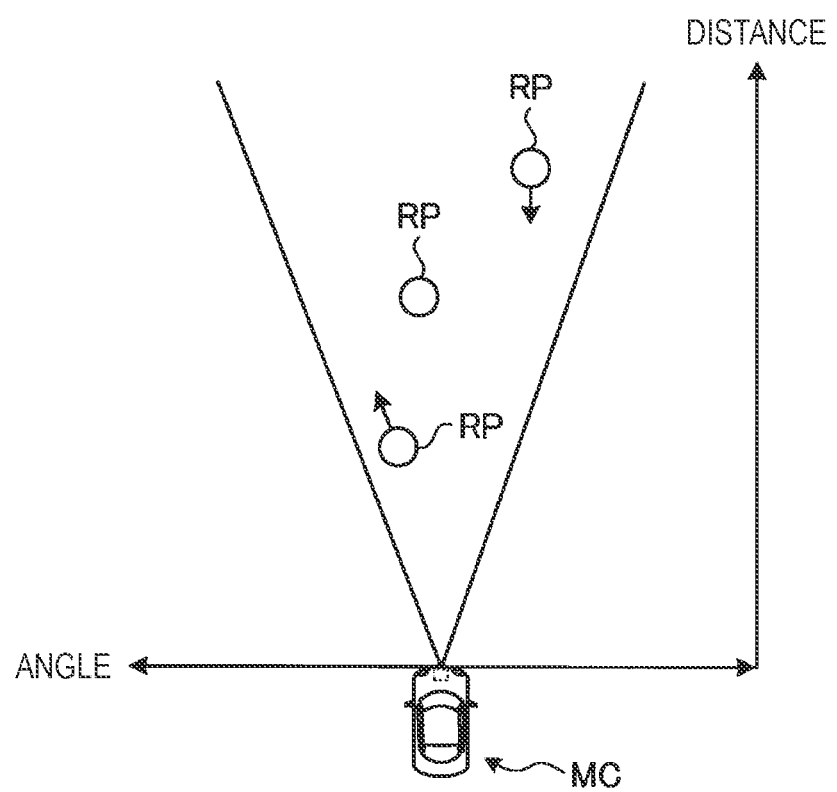
FIG. 4C is a view for explaining a second part of the procedure of the pairing process.

In order to facilitate understanding of the description, the flow of processing from a preliminary process of the signal processing unit 32 to the instantaneous-value outputting process of the signal processing unit 32 is shown in FIG. 3 to FIG. 4C. FIG. 3 is a view for explaining the procedure from the preliminary process of the signal processing unit 32 to the peak extracting process of the signal processing unit 32.

Also, FIG. 4A is a view for explaining the procedure of the angle estimating process. Also, FIG. 4B and FIG. 4C are views for explaining a first part and a second part of the procedure of the pairing process. Also, FIG. 3 has three areas divided by two white bold down arrows. Those areas hereinafter will be referred to as an upper part, a middle part, and a lower part in the order of them.

As shown in the upper part of FIG. 3, after a transmission signal fs(t) is transmitted as a transmission wave from the transmitting antennae 13, if the reflected wave of the transmission wave from a target reaches the radar device, the reflected wave is received as a reception signal fr(t) by each receiving antenna 21.

In this case, as shown in the upper part of FIG. 3, with respect to the transmission signal fs(t), the reception signal fr(t) has a time lag τ according to the distance between the vehicle MC and the target. Due to the Doppler effect based on the time lag τ and the relative velocity between the vehicle MC and the target, as a beat signal, a signal in which the frequency fup of UP sections in which the frequency increases and the frequency fdn of DN sections in which the frequency decreases are repeated is obtained (see the middle part of FIG. 3).

The frequency analyzing unit 32a performs an FFT process on the beat signal, and the UP section side and the DN section side of the result of the FFT process are schematically shown in the lower part of FIG. 3.

In the frequency domain, the UP section side and the DN section side of the result of the FFT process have waveforms as shown in the lower part of FIG. 3. From those waveforms, the peak extracting unit 32b extracts peak frequencies of peaks.

For example, in the example shown in the lower part of FIG. 3, with reference to a peak extraction threshold, in the UP section side, peaks Pu1 to Pu3 are determined as peaks, and the peak frequencies fu1 to fu3 thereof are extracted.

Also, in the DN section side, similarly, with reference to the same peak extraction threshold, peaks Pd1 to Pd3 are determined as peaks, and the peak frequencies fd1 to fd3 thereof are extracted.

In this case, some peak frequencies extracted by the peak extracting unit 32b may include frequency components corresponding to reflected waves from a plurality of targets. For this reason, the instantaneous-value generating unit 32c performs the angle estimating process of performing azimuth calculation with respect to each of the peak frequencies, thereby analyzing whether a target corresponding to the corresponding peak frequency exists.

The instantaneous-value generating unit 32c can perform the azimuth calculation using a well-known incidence direction estimating method such as ESPRIT (Estimation of Signal Parameters via Rotational Invariance Techniques).

FIG. 4A is a view schematically illustrating the results of the azimuth calculation of the instantaneous-value generating unit 32c. From the peaks Pu1 to Pu3 of the azimuth calculation results, the instantaneous-value generating unit 32c calculates estimate angles of targets (reflection points) corresponding to the peaks Pu1 to Pu3, respectively. Also, the magnitudes of the peaks Pu1 to Pu3 are handled as power values. The instantaneous-value generating unit 32c performs the angle estimating process on each of the UP section side and the DN section side, as shown in FIG. 4B.

Then, on the basis of the azimuth calculation results, the instantaneous-value generating unit 32c performs a pairing process of pairing peaks having similar estimate angles and similar power values. Also, on the basis of the pairs of peaks, the instantaneous-value generating unit 32c calculates the distance and relative velocity of each of the targets (reflection points) corresponding to the pairs of peaks.

The distance of each target can be calculated on the basis of the following relationship: [Distance]∝(fup+fdn). The relative velocity of each target can be calculated on the basis of the following relationship: [Velocity]∝(fup−fdn). As a result, as shown in FIG. 4C, pairing results representing the instantaneous values of the estimate angles, distances, and relative velocities of the individual reflection points RP with respect to the vehicle MC are obtained.

At this moment, the individual reflection points RP are just reflection points corresponding to the individual peaks extracted in the peak extracting process, and each do not necessarily represent one target. In other words, in the case where such a split state as described above (see FIG. 1B and FIG. 1C) has occurred, it is required to associate a plurality of reflection points RP with target data on one target.

Now, referring to FIG. 2 again, the filtering unit 32d will be described. The filtering unit 32d generates target data while associating the instantaneous values of the plurality of reflection points RP with one target if necessary.

Specifically, on the instantaneous values of the individual reflection points RP received from the instantaneous-value generating unit 32c, the filtering unit 32d appropriately assigns each instantaneous value to one target while using a particle filter. Also, the filtering unit 32d derives the likelihood of each of the assigned instantaneous values while using the particle filter, and calculates a representative instantaneous value related to one target on the basis of the likelihood. Further, the filtering unit 32d generates target data on the basis of the calculated representative instantaneous value, and outputs the target data as a filtered value obtained by the filtering process, to the vehicle control device 2.

Figure 5:
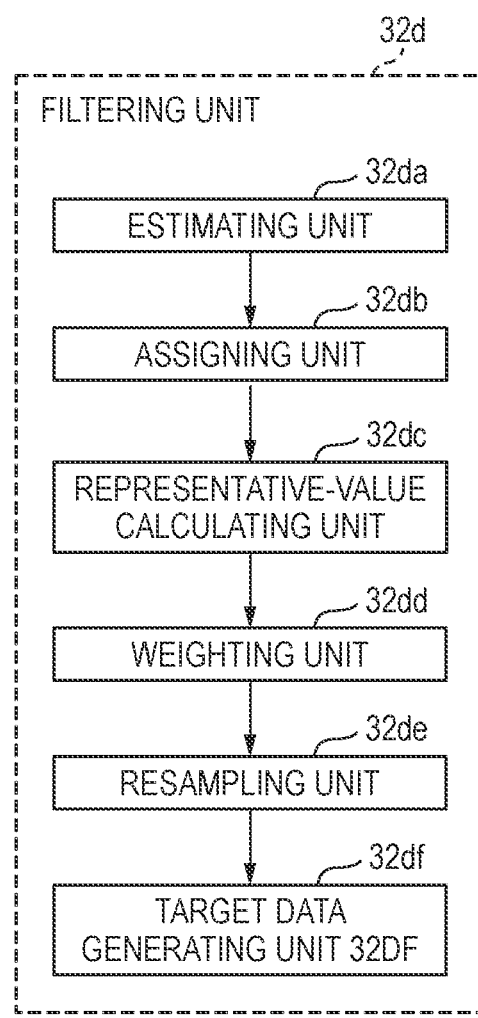
FIG. 5 is a block diagram illustrating a filtering unit.
Figure 6A:
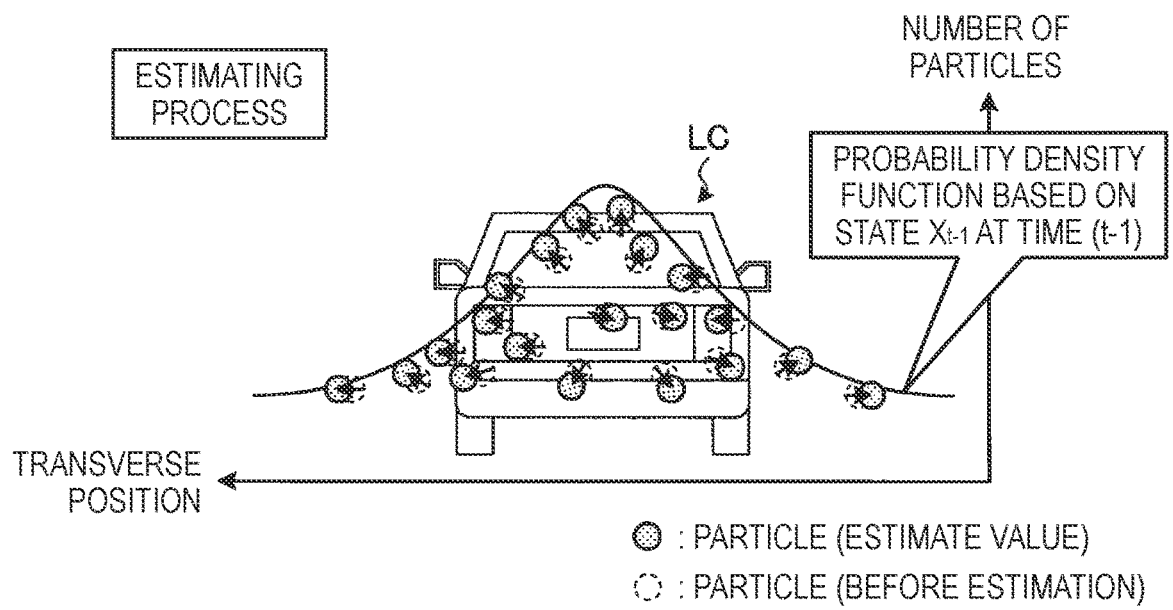
FIG. 6A is a view for explaining the procedure of an estimating process.
Figure 6B:
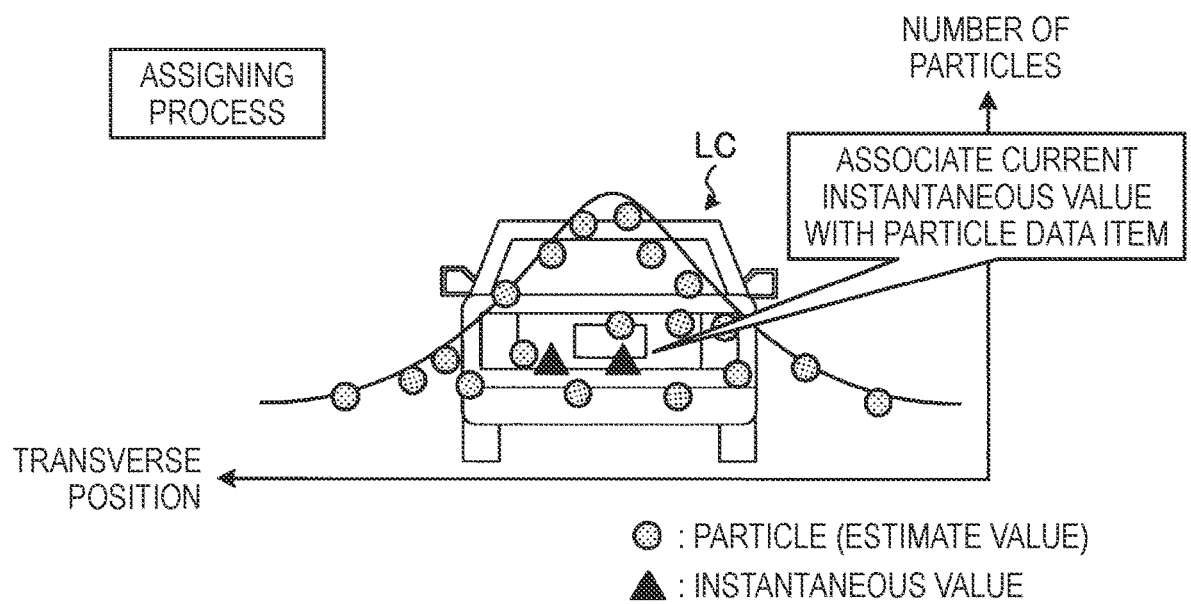
FIG. 6B is a view for explaining the procedure of an assigning process.
Figure 6C:
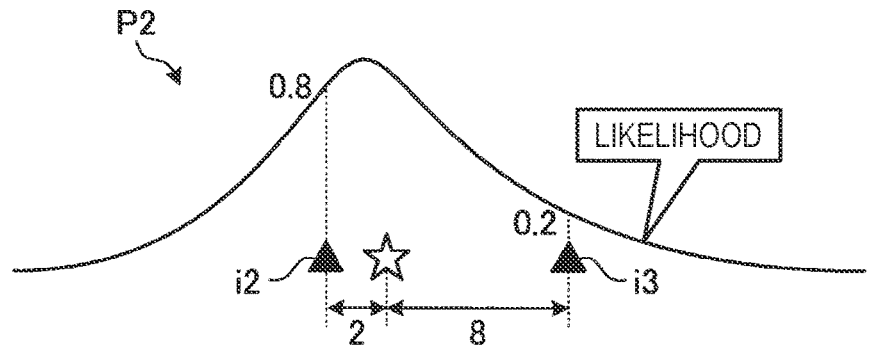
FIG. 6C is a view for explaining the procedure of a representative-value calculating process.
Figure 6D:
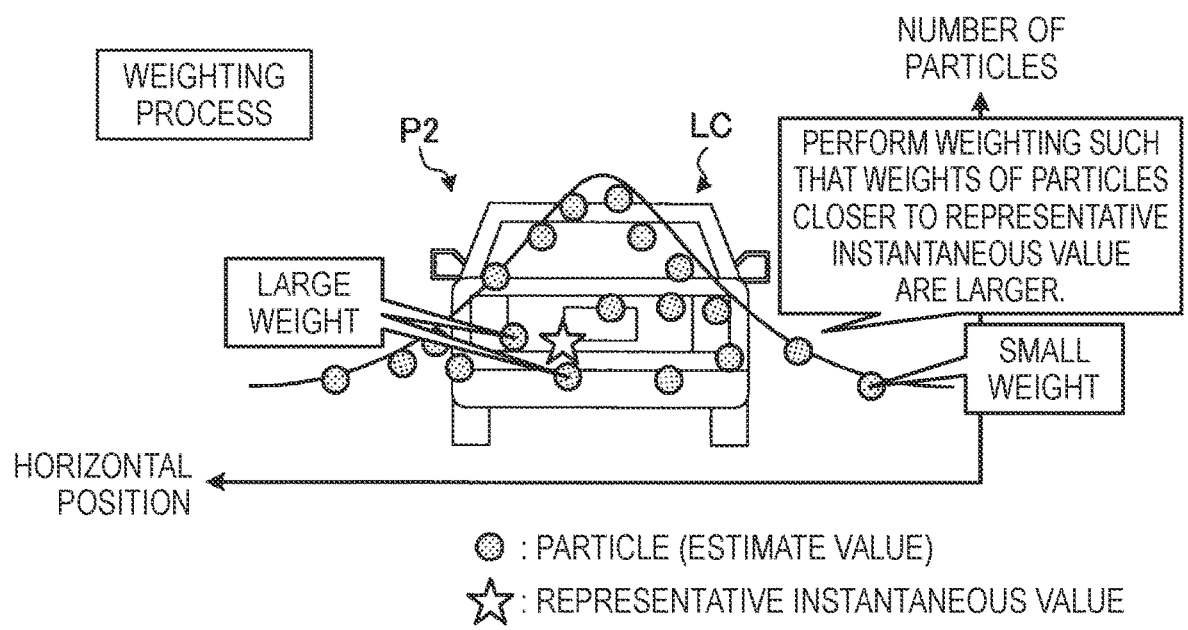
FIG. 6D is a view for explaining the procedure of a weighting process.
Figure 6E:
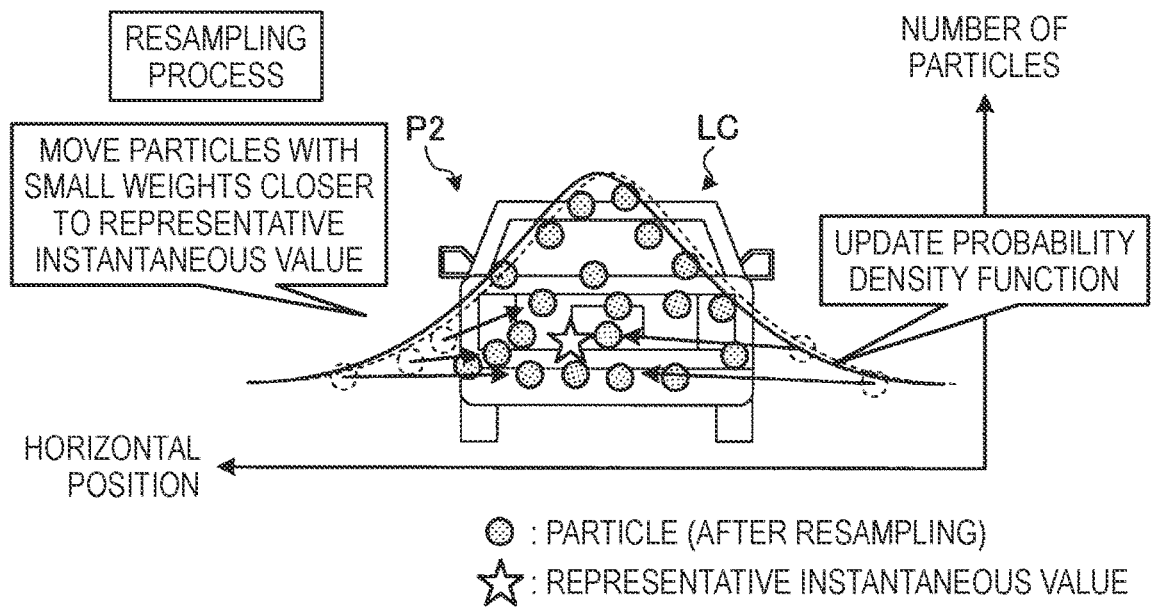
FIG. 6E is a view for explaining the procedure of a resampling process.
Figure 6F:
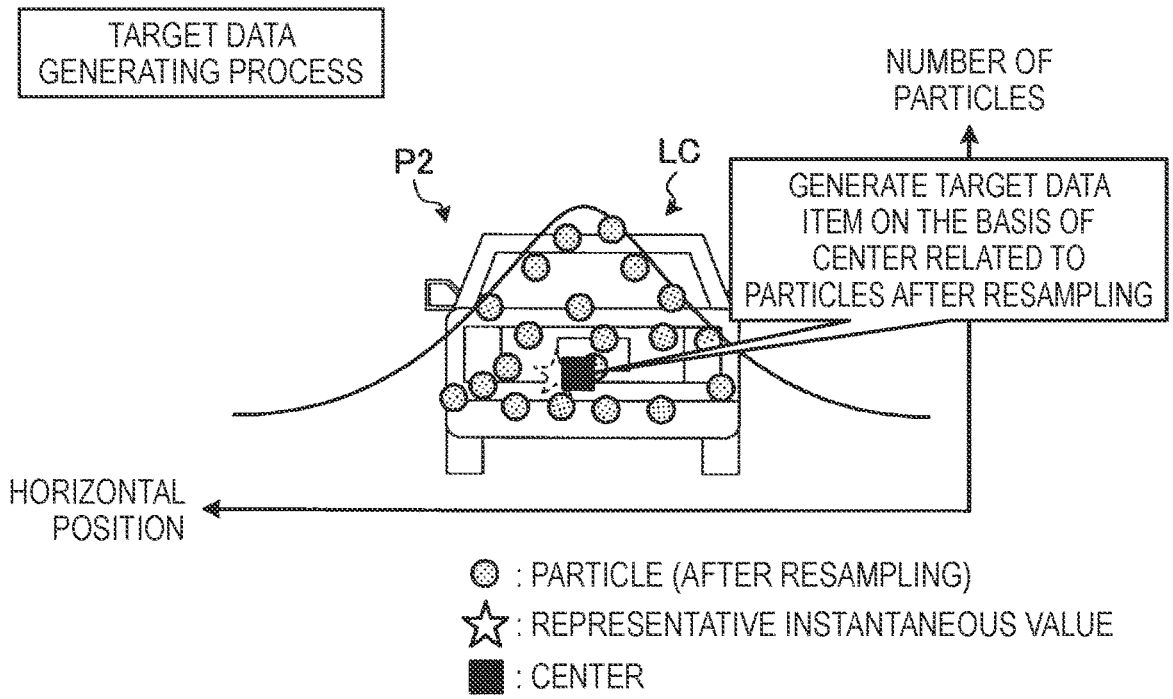
FIG. 6F is a view for explaining the procedure of a target data generating process.

Now, the filtering process which is performed by the filtering unit 32d will be described in more detail with reference to FIG. 5 to FIG. 7C. FIG. 5 is a block diagram illustrating the filtering unit 32d. Also, FIG. 6A is a view for explaining the procedure of an estimating process. Also, FIG. 6B is a view for explaining the procedure of an assigning process. Also, FIG. 6C is a view for explaining a representative-value calculating process. Also, FIG. 6D is a view for explaining the procedure of a weighting process. Also, FIG. 6E is a view for explaining the procedure of a resampling process. Also, FIG. 6F is a view for explaining the procedure of a target data generating process. Also, in FIG. 6 and the like, transverse positions are shown on the transverse axis; however, this is just an example in which only transverse positions have been extracted from various elements included in instantaneous values.

Figure 7A:
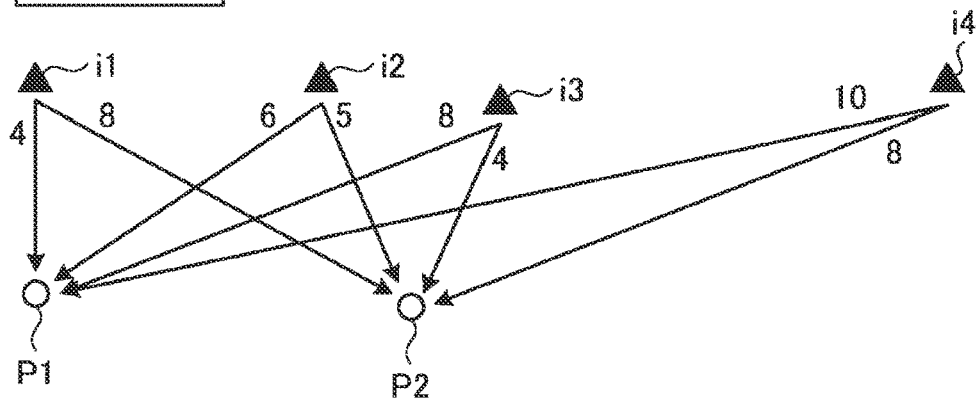
FIG. 7A is a view for explaining a first part of the assigning process in detail.
Figure 7B:
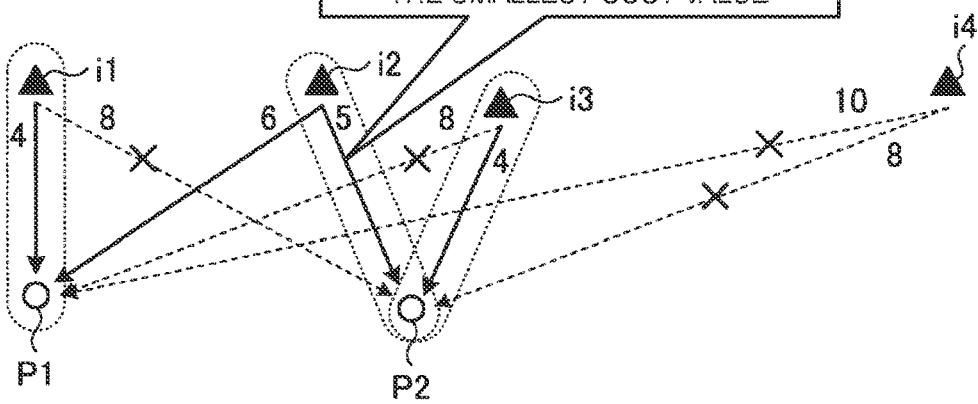
FIG. 7B is a view for explaining a second part of the assigning process in detail.
Figure 7C:
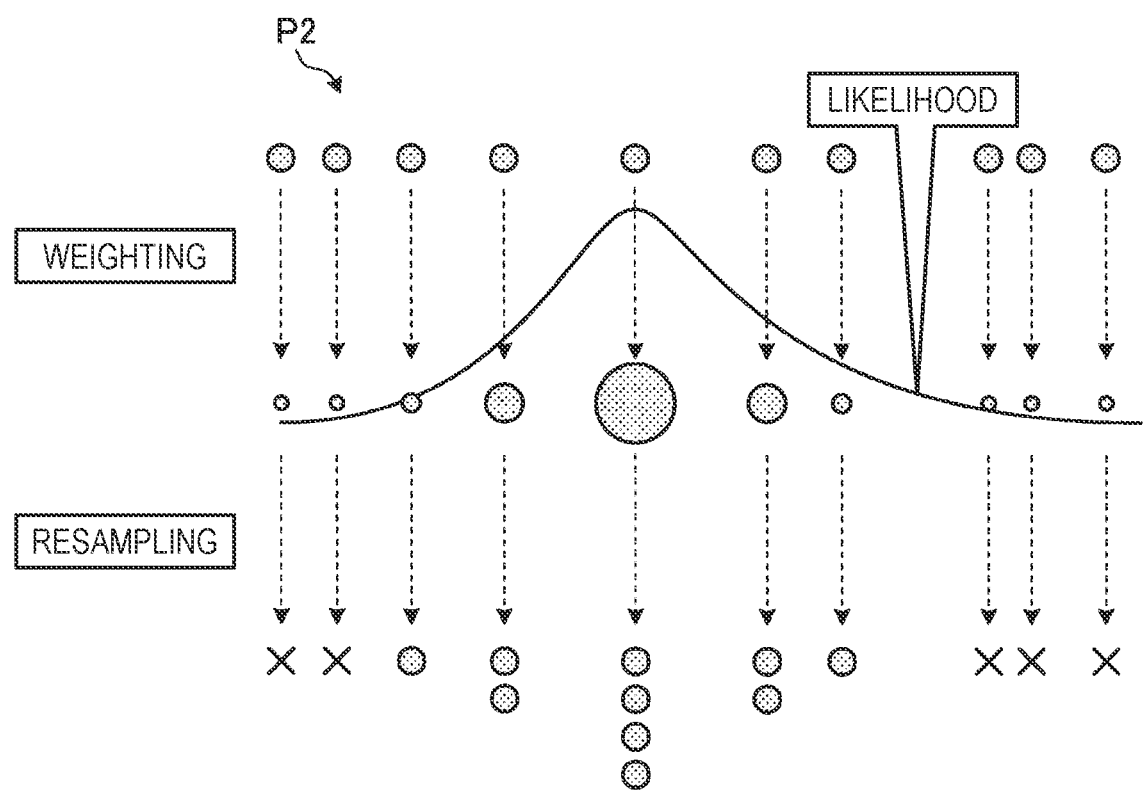
FIG. 7C is a view for explaining the weighting process and the resampling process in detail.

Also, FIGS. 7A and 7B are views for explaining a first part and a second part of the assigning process in detail. Also, FIG. 7C is a view for explaining the weighting process and the resampling process in detail.

As shown in FIG. 5, the filtering unit 32*d* includes an estimating unit 32*da*, an assigning unit 32*db*, a representative-value calculating unit 32*dc*, a weighting unit 32*dd*, a resampling unit 32*de*, and a target data generating unit 32*df*.

The estimating unit 32*da* performs the estimating process of sample points (particles) of the particle filter. The estimating process will be described specifically. As shown in FIG. 6A, first, it is assumed that one target corresponding to one target data item is a preceding vehicle LC. Also, it is assumed that the preceding vehicle LC has been already detected as a target by scanning until the previous cycle.

If it is assumed that the latest scanning timing is a time t, and the distribution of the particles of the particle filter is a state X, as shown in FIG. 6A, the estimating unit 32*da* distributes (samples) N-number of particles on the basis of a probability density function based on a state $X_{t-1}$ at the previous scanning time (t−1), and moves the individual particles on the velocities of the previous values. In other words, the estimating unit 32*da* distributes the individual particles in a range where the instantaneous value of the preceding vehicle LC may appear during the latest scanning.

A further description of FIG. 5 will be made. Subsequently, the estimating unit 32*da* outputs the estimate results to the assigning unit 32*db*. Also, the estimating unit 32*da* distributes particles in an initial state with respect to a new target which has not been detected until the previous cycle. Also, since the estimating unit 32*da* performs the estimating process not only with respect to the preceding vehicle LC but also with respect to each of the other targets, a plurality of sets of particle data items is generated, and the number of the sets is the same as the number of estimating processes, and the number of particle data items of each set is the same as the product of the number of particles and N.

The assigning unit 32*db* performs the assigning process of assigning the instantaneous values (observation values) obtained by the latest scanning to the particle data items which are the estimate results of the estimating unit 32*da*. Specifically, as shown in FIG. 6B, the assigning unit 32*db* performs the assigning process of associating a current instantaneous value and a particle data item (any one particle data item of the estimate results estimated by the estimating unit 32*da*).

More specifically, as shown in FIG. 7A, the assigning unit 32*db* performs cost calculation of calculating cost values with respect to all combinations of the estimated particle data items and the instantaneous values. The cost values are parameters which are calculated on the basis of distances, relative velocities, estimate angles, longitudinal positions, transverse positions, longitudinal velocities, transverse velocities, and the like included in the instantaneous values, and a larger value is more unlikely to be assigned. The longitudinal velocities and the transverse velocities are calculated, for example, by a time average filter based on the instantaneous values.

Also, FIG. 7A shows the case where individual cost values shown in the drawing have been calculated with respect to all combinations of four instantaneous values i1 to i4 and two particle data items P1 and P2 (a total of 8 combinations).

Subsequently, the assigning unit 32*db* performs assigning of associating the instantaneous values i1 to i4 with the particle data items P1 and P2 on the basis of the calculated individual cost values. More specifically, as shown in FIG. 7B, the assigning unit 32*db* performs assigning by determining whether each cost value is equal to or smaller than a predetermined cost value threshold, or not.

The cost value threshold is a boundary of a target data assignment range. For example, as shown in FIG. 7B, it is assumed that the cost value threshold is 7. In this case, first, combinations shown by "X" in FIG. 7B are excluded from assignment objects since their cost values are larger than 7.

In the case where a plurality of combinations having cost values equal to or smaller than the threshold exists with respect to one instantaneous value, the assigning unit 32*db* assigns the instantaneous value to a particle data item having the smallest cost value. According to the above-described procedure, in the example of FIG. 7B, the assigning unit 32*db* assigns the instantaneous value i1 to the particle data item P1. Also, the assigning unit 32*db* assigns the instantaneous values i2 and i3 to the same particle data item P2. In other words, the assigning unit 32*db* can assign the plurality of instantaneous values to one particle data item P2 corresponding to one target data item. In other words, for example, in the case where a split state has occurred, a plurality of instantaneous values can be assigned to one target data item representing one target.

A further description of FIG. 5 will be made. Subsequently, the assigning unit 32*db* outputs the assignment results to the representative-value calculating unit 32*dc*. The representative-value calculating unit 32*dc* performs a representative-value calculating process of calculating the likelihood of each of the plurality of instantaneous values assigned to one particle data item, on the basis of the assignment results of the assigning unit 32*db*, and calculating a representative instantaneous value (corresponding to an example of a representative value) on the basis of the likelihood.

In FIG. 6B, the instantaneous values i2 and i3 assigned to the same particle data item P2 are shown as examples. Specifically, as shown in FIG. 6C, the representative-value calculating unit 32*dc* calculates the likelihood of the instantaneous values i2 and i3 in a state space corresponding to the particle data item P2. Here, the likelihood of an instantaneous value is a parameter representing the plausibility of the instantaneous value, and represents the reliability of the instantaneous value assigned (the probability that the corresponding instantaneous value is an instantaneous value based on a reflected wave from a tracking target). Although the particles are not shown in FIG. 6C, instantaneous values existing at a position where the density of particle distribution is higher have higher likelihood. Subsequently, the representative-value calculating unit 32*dc* calculates, for example, the center value of the instantaneous values i2 and i3 as a representative instantaneous value on the basis of the calculated likelihood of the instantaneous values i2 and i3.

As an example, as shown in FIG. 6C, in the case where 0.8 and 0.2 are sequentially obtained as the likelihood of the instantaneous values i2 and i3, for example, the representative-value calculating unit 32*dc* determines a value having the ratio of 2:8 between the difference from the instantaneous value i2 and the difference from the instantaneous value i3, as a representative instantaneous value.

A further description of FIG. 5 will be made. Subsequently, the representative-value calculating unit 32*dc* outputs the calculated representative instantaneous value to the weighting unit 32*dd*. The weighting unit 32*dd* performs a weighting process on the particle data items such that larger weights are assigned to particles closer to the representative instantaneous value and smaller weighs are assigned to particles farther from the representative instantaneous value.

Subsequently, the weighting unit 32*dd* outputs the weighted results to the resampling unit 32*de*. The resampling unit 32*de* performs a resampling process of moving particles having small weights toward the representative instantaneous value.

Also, the resampling unit 32*de* outputs the resampling result to the target data generating unit 32*df*. The target data generating unit 32*df* performs a target data generating process of generating a target data item on the basis of the resampling result.

Specifically, as shown in FIG. 6D, in the weighting process, for example, the weighting unit 32*dd* assigns larger weights to particles closer to the representative instantaneous value are larger (see "LARGE WEIGHT" in the drawing). Meanwhile, the weighting unit assigns smaller weights to particles farther from the representative instantaneous value (see "SMALL WEIGHT" in the drawing). Here, the distance of an instantaneous value from the representative instantaneous value means a Mahalanobis distances derived on the basis of at least one of the distance, relative velocity, estimate angle, longitudinal position, transverse position, longitudinal velocity, and transverse velocity of the corresponding instantaneous value.

Subsequently, as shown in FIG. 6E, in the resampling process, the resampling unit 32*de* moves particles with small weights closer to particles with large weights close to the representative instantaneous value.

More specifically, as shown in FIG. 7C, the weighting unit 32*dd* performs weighting according to the correlation between each particle in the particle data item P2 and the above-mentioned representative instantaneous value. In FIG. 7C, larger particles represent particles with larger weights.

By the weighting, it is possible to obtain the likelihood of each particle in the state space corresponding to the preceding vehicle LC. Here, the likelihood is shown very schematically. As shown in FIG. 7C, the resampling unit 32*de* discards particles with small weights on the basis of the weighting results of the weighting unit 32*dd*, and performs resampling such that the number of particles with large weights increases by the number of discarded particles. Then, the resampling unit 32*de* updates the probability density function on the basis of the resampling result.

Subsequently, as shown in FIG. 6F, in a target data generating process, the target data generating unit 32*df* generates a target data item on the basis of the center related to the particles after the resampling. Here, the center is used; however, instead of the center, the average may be used.

Figure 8A:
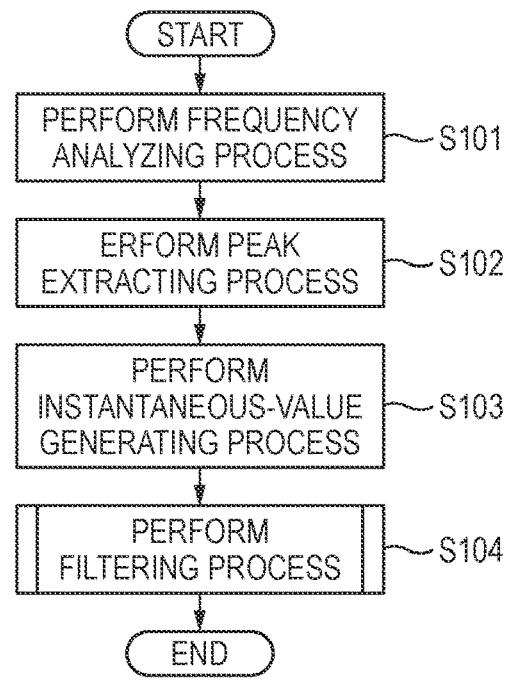
FIG. 8A is a flow chart illustrating a processing procedure which is performed by a processing unit of the radar device according to the first embodiment.
Figure 8B:
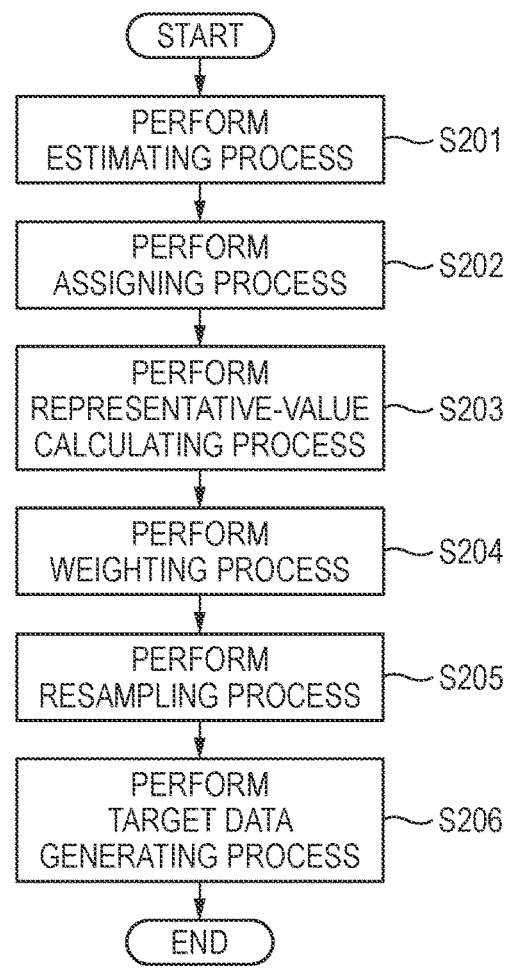
FIG. 8B is a flow chart illustrating the procedure of the filtering process.

Now, a processing procedure which is performed by the processing unit 30 of the radar device 1 according to the present embodiment will be described with reference to FIGS. 8A and 8B. FIG. 8A is a flow chart illustrating the processing procedure which is performed by the processing unit 30 of the radar device 1 according to the first embodiment. Also, FIG. 8B is a flow chart illustrating the procedure of the filtering process. However, FIG. 8B shows the procedure of signal processing corresponding to one scanning process.

As shown in FIG. 8A, the frequency analyzing unit 32*a* performs a frequency analyzing process (STEP S101). Then, the peak extracting unit 32*b* performs a peak extracting process on the basis of the process results of the frequency analyzing process (STEP S102).

Subsequently, the instantaneous-value generating unit 32*c* performs an instantaneous-value generating process on the basis of the process results of the peak extracting process (STEP S103). Next, the filtering unit 32*d* performs a filtering process on the basis of the process results of the instantaneous-value generating process (STEP S104).

In the filtering process, as shown in FIG. 8B, filtering using the particle filter is performed. First, the estimating unit 32*da* performs an estimating process (STEP S201). Next, the assigning unit 32*db* performs an assigning process on the basis of the process results of the estimating process (STEP S202). Subsequently, the representative-value calculating unit 32*dc* performs a representative-value calculating process on the basis of the process results of the assigning process (STEP S203).

Next, the weighting unit 32*dd* performs a weighting process on the basis of the process results of the representative-value calculating process (STEP S204). Subsequently, the resampling unit 32*de* performs a resampling process on the basis of the process results of the weighting process (STEP S205).

Next, the target data generating unit 32*df* performs a target data generating process on the basis of the process results of the resampling process (STEP S206), and outputs the generated target data items, and finishes the procedure.

A further description of FIG. 8A will be made. Subsequently, the filtering unit 32*d* outputs the target data items which are the process results of the filtering process to the vehicle control device 2, and finishes the procedure of signal processing corresponding to one scanning process.

As described above, the radar device 1 according to the first embodiment is the radar device 1 configured to detect targets on the basis of the frequency-modulated transmission wave and reflected waves of the transmission waves from targets, and includes the peak extracting unit 32*b* (corresponding to an example of an extracting unit), an instantaneous-value generating unit 32*c* (corresponding to an example of a generating unit), and the filtering unit 32*d*.

The peak extracting unit 32*b* extracts peaks corresponding to targets on the basis of beat signals which are differential waves between the transmission wave and reflected waves. On the basis of the peaks extracted by the peak extracting unit 32*b*, the instantaneous-value generating unit 32*c* generates instantaneous values corresponding to the peaks.

The filtering unit 32*d* generates target data items which are filtered values corresponding to the instantaneous values generated by the instantaneous-value generating unit 32*c*, by performing chronological filtering on the instantaneous values. Also, the filtering unit 32*d* can assign a plurality of instantaneous values to an assignment range corresponding to one target data item, on the basis of individual elements included in instantaneous values.

Therefore, according to the radar device 1 of the first embodiment, it is possible to assign a plurality of instantaneous values to one target data item, and it is possible to improve the accuracy of target detection.

Also, the filtering unit 32*d* derives representative instantaneous values (corresponding to examples of a representative value) of the instantaneous values based on the individual elements on the basis of the likelihood of the instantaneous values, and generates target data items on the basis of the derived representative instantaneous values.

Therefore, according to the radar device 1 of the first embodiment, since it is possible to generate a target data item based on a representative instantaneous value derived on the basis of the probabilities of a plurality of instantaneous values, it is possible to improve the accuracy of target detection.

Also, the filtering unit 32*d* uses the particle filter, and includes the estimating unit 32*da* and the assigning unit 32*db*. The estimating unit 32*da* estimates behavior of a plurality of particles distributed in a state space corresponding to each assignment range as described above. The assigning unit 32db derives cost values (corresponding to examples of an evaluation value) evaluating the relations between the particle data items which are the estimate results of the estimating unit 32da and the instantaneous values, on the basis of the individual elements, and determines instantaneous values to be assigned to the particle data items corresponding to the assignment ranges, on the basis of the derived cost values.

Therefore, according to the radar device 1 of the first embodiment, even in the case where there is a plurality of instantaneous values corresponding to the assignment range of one target data item, it is possible to appropriately assign an instantaneous value. Also, as a result, it is possible to prevent decrease in the stability and reliability of target detection, and it is possible to improve the accuracy of target detection.

Also, the filtering unit 32d includes the weighting unit 32dd, the resampling unit 32de, and the target data generating unit 32df. The weighting unit 32dd performs weighting on the particle data items such that larger weights are assigned to particles closer to the representative instantaneous values assigned to the particle data items and smaller weights are assigned to particles farther to the representative instantaneous values. The resampling unit 32de resamples particles on the basis of the likelihood of the particles based on the weighting results of the weighting unit 32dd. The target data generating unit 32df generates target data items on the basis of the centers or/and the averages related to particles after the resampling of the resampling unit 32de.

Therefore, according to the radar device 1 of the first embodiment, it is possible to generate target data items according to the results of the particle filter obtaining by assigning larger weights to particles closer to representative instantaneous values and performing resampling, and it is possible to accurately track targets on the basis of the generated target data items.

Also, the filtering unit 32d derives the center values of the instantaneous values included in the assignment ranges on the basis of the likelihood of the instantaneous values, and determines the center values as representative instantaneous values.

Therefore, according to the radar device 1 of the first embodiment, since a representative instantaneous value corresponding to each target data item is a more reliable value based on the likelihood of a plurality of instantaneous values, it becomes possible to accurately track targets on the basis of such target data items.

Also, elements of instantaneous values include at least the distances, relative velocities, and estimate angles of peaks. Therefore, according to the radar device 1 of the first embodiment, since the assignment ranges and likelihood of instantaneous values are determined on the basis of at least distances, relative velocities, and estimate angles represented by instantaneous values, it is possible to contribute to generation of more reliable target data items.

In the above-described embodiment, the case of generating representative instantaneous values from instantaneous values have been taken as an example; however, the embodiment is not limited thereto. Also, in the above-described embodiment, the case of using the particle filter has been taken as an example; however, the particle filter may not be used. Hereinafter, other such embodiments will be described. FIG. 9A is a view for explaining an outline of a target detecting method according to a second embodiment. Also, FIG. 9B is a block diagram of a filtering unit 32d' according to the second embodiment. Also, FIG. 9C is a view for explaining an outline of a target detecting method according to a third embodiment.

Second Embodiment

Figure 9A:
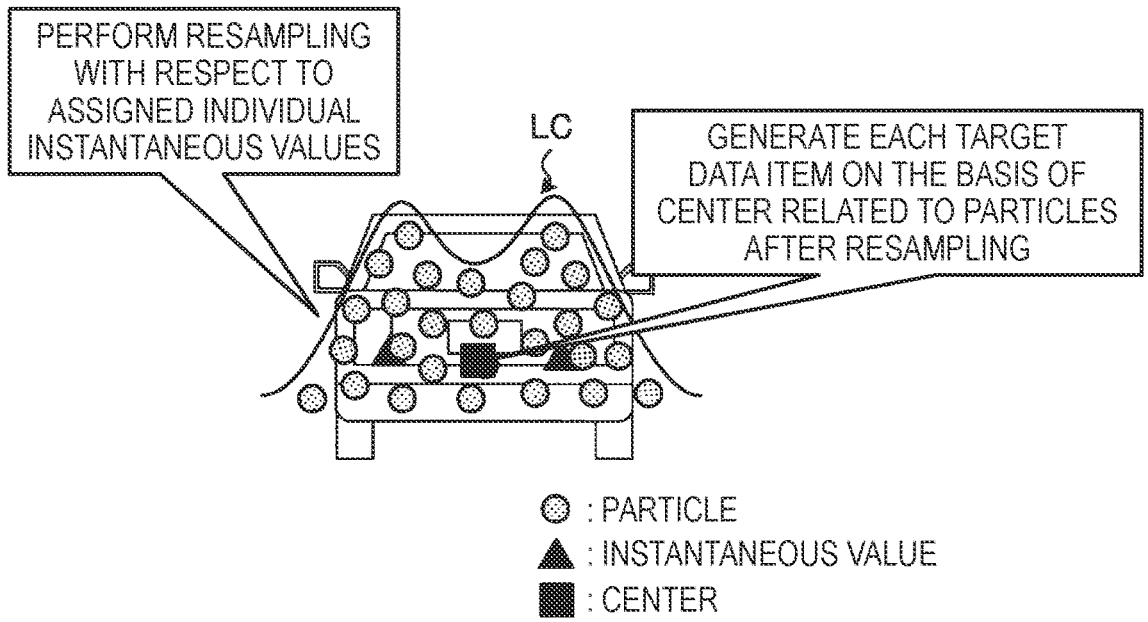
FIG. 9A is a view for explaining an outline of a target detecting method according to a second embodiment.

As the second embodiment, the case where representative instantaneous values are not generated is shown in FIG. 9A. In this example, according to distributed particles, instantaneous values assigned to the assignment ranges of target data items are resampled. Thereafter, in the second embodiment, on the basis of the centers related to the particles after the resampling, target data items are generated.

Figure 9B:
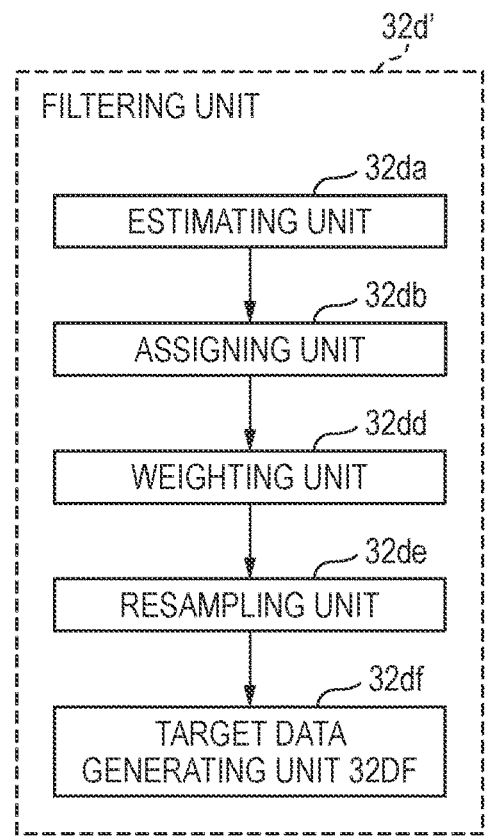
FIG. 9B is a block diagram illustrating a filtering unit according to the second embodiment.

More specifically, as shown in FIG. 9B, the filtering unit 32d' according to the second embodiment includes an estimating unit 32da, an assigning unit 32db, a weighting unit 32dd, a resampling unit 32de, and a target data generating unit 32df. In other words, the filtering unit 32d' is different from the filtering unit 32d according to the first embodiment described above in that it has no representative-value calculating unit 32dc.

In other words, in the filtering unit 32d', the estimating unit 32da performs the estimating process described with reference to FIG. 6A, and the assigning unit 32db performs the assigning process described with reference to FIG. 6 (while supplementally referring to FIG. 7A and FIG. 7B). Therefore, similarly to the first embodiment, for example, a plurality of instantaneous values is assigned to the assignment range of one target data item.

Subsequently, in the filtering unit 32d', the weighting unit 32dd performs the weighting process described with reference to FIG. 6D (while supplementally referring to FIG. 7C). However, here, weighting is performed such that particles closer to individual instantaneous values, not to representative instantaneous values as shown in FIG. 6D, have larger weights.

Thereafter, on the basis of the weighting results, the resampling unit 32de performs a resampling process of performing resampling with respect to the assigned individual instantaneous values as shown in FIG. 9A. Subsequently, the target data generating unit 32df generates target data items, as shown in FIG. 9A, on the basis of the centers (or the averages) related to the particles after the resampling.

Also, as a pattern in which representative instantaneous values which are different from individual instantaneous values are not generated, for example, the likelihood of the individual instantaneous values may be calculated and which have the highest likelihood may be analyzed, and instantaneous values having the highest likelihood may be used as representative instantaneous values. Also, for example, if an instantaneous value which is most likely to be from the assignment range of each target data item can be grasped when individual instantaneous values are separated from one another, a representative value may be determined from the other instantaneous values.

Third Embodiment

Figure 9C:
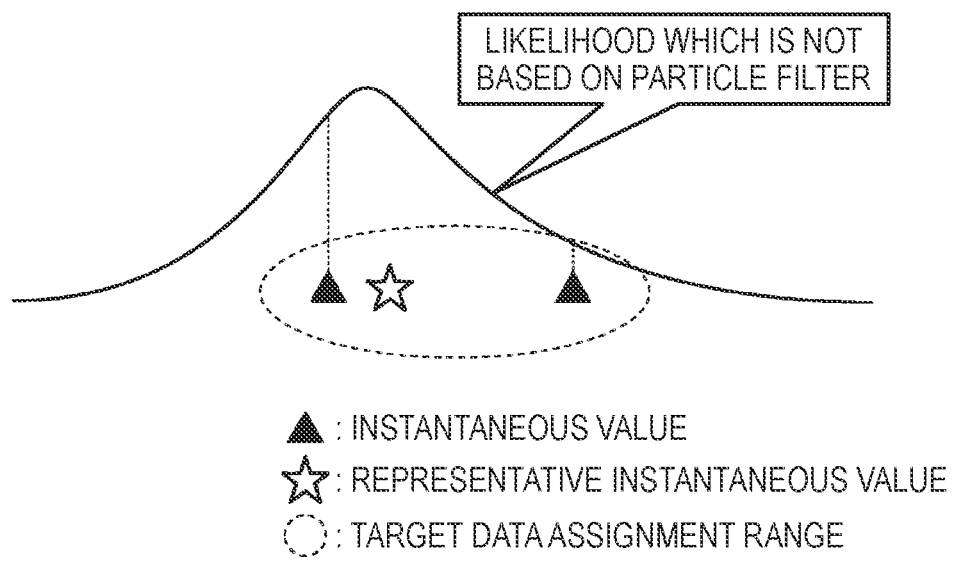
FIG. 9C is a view for explaining an outline of a target detecting method according to a third embodiment.

As a third embodiment, the case where any particle filter is not used is shown in FIG. 9C. As shown in FIG. 9C, a plurality of instantaneous values may be assigned to the assignment range of a target data item, and the likelihood of individual instantaneous values which are not based on a particle filter may be calculated on the basis of the target data item and parameters such as distances, relative velocities, estimate angles, longitudinal positions, transverse positions, longitudinal velocities, and transverse velocities included in the individual instantaneous values, and a representative instantaneous value may be generated, for example, according to the example shown in FIG. 6C or the like.

Also, in each embodiment described above, parameters such as distances, relative velocities, estimate angles, longitudinal positions, transverse positions, longitudinal velocities, and transverse velocities have been taken as examples; however, power values may be further included.

Also, in each embodiment described above, the case where the radar device 1 is an FM-CW type has been taken as an example; however, the present invention is not limited thereto. For example, the radar device 1 may be an FCM (Fast Chirp Modulation) type.

Also, in each embodiment described above, as an example of the incidence direction estimating method which is used in the radar device, ESPRIT has been taken. However, the present invention is not limited thereto. For example, DBF (Digital Beam Forming), PRISM (Propagator method based on an Improved Spatial-smoothing Matrix), MUSIC (Multiple Signal Classification), and so on also may be used.

Also, in each embodiment described above, the radar device 1 is mounted on the vehicle MC; however, needless to say, it may be mounted on a moving object other than vehicles, such as a ship or an aircraft.

Various advantages and modifications can be easily achieved by those skilled in the art. Therefore, the invention in its broader aspects is not limited to the specific details and representative embodiments shown and described above. Accordingly, various modifications may be made without departing from the spirit or scope of the general inventive concept as defined by the appended claims and their equivalents.

What is claimed is:

1. A radar device for detecting a target based on a frequency-modulated transmission wave and reflected waves of the transmission wave from the target, comprising:
a processor programmed to:
extract peaks corresponding to the target based on beat signals which are differential waves between the transmission wave and the reflected waves;
generate instantaneous values corresponding to the peaks based on the extracted peaks; and
generate a target data item corresponding to the instantaneous values by performing chronological filtering on the generated instantaneous values, by assigning a plurality of instantaneous values to an assignment range corresponding to one target data item based on individual elements included in the instantaneous values.

2. The radar device according to claim 1, wherein the processor is programmed to:
derive a representative value of the instantaneous values based on a likelihood of the instantaneous values based on the individual elements; and
generate the target data item based on the representative value.

3. The radar device according to claim 2, wherein the processor uses a particle filter and is programmed to:
estimate behavior of a plurality of particles distributed in a state space corresponding to the assignment range;
derive evaluation values evaluating relations between particle data items which are estimate results and the instantaneous values, based on the individual elements; and
determine instantaneous values to be assigned to the particle data items corresponding to the assignment range, based on the evaluation values.

4. The radar device according to claim 3, wherein the processor is programmed to:
perform weighting on the particle data items such that larger weights are assigned to particles of particle data items closer to the representative value and smaller weights are assigned to particles of particle data items farther from the representative value;
resample particles based on a likelihood of the particles based on the weighting results; and
generate a target data item based on at least one of a center or average related to the particles after the resampling.

5. The radar device according to claim 4, wherein the processor is programmed to:
derive a center value of the instantaneous values included in the assignment range based on the likelihood of the instantaneous values; and
determine the center value as the representative value.

6. The radar device according to claim 1, wherein the elements include at least distances, relative velocities, and estimate angles of the peaks.

7. A target detecting method of detecting a target based on a frequency-modulated transmission wave and reflected waves of the transmission wave from the target, comprising:
extracting, using a processor, peaks corresponding to the target based on beat signals which are differential waves between the transmission wave and the reflected waves;
generating, using the processor, instantaneous values corresponding to the peaks based on the extracted peaks; and
generating, using the processor, a target data item corresponding to the instantaneous values by performing chronological filtering on the generated instantaneous values, by assigning a plurality of instantaneous values to an assignment range corresponding to one target data item based on individual elements included in the instantaneous values.

* * * * *